United States Patent
Ota et al.

(10) Patent No.: US 8,313,223 B2
(45) Date of Patent: *Nov. 20, 2012

(54) TAILLIGHT APPARATUS

(75) Inventors: Hiroyasu Ota, Saitama (JP); Eiji Ashihara, Saitama (JP); Lucio Olivetti, Piemonte (IT)

(73) Assignee: Honda Motor Co., Ltd., Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 12/920,846

(22) PCT Filed: Mar. 6, 2008

(86) PCT No.: PCT/JP2008/054024
§ 371 (c)(1),
(2), (4) Date: Oct. 20, 2010

(87) PCT Pub. No.: WO2009/110080
PCT Pub. Date: Sep. 11, 2009

(65) Prior Publication Data
US 2011/0273899 A1 Nov. 10, 2011

(51) Int. Cl.
*F21S 8/10* (2006.01)
(52) U.S. Cl. .................. 362/545; 362/540; 362/249.02
(58) Field of Classification Search .................. 362/219, 362/231, 240–245, 297, 308–310, 327–346, 362/485, 487, 516–522, 540–545, 800
See application file for complete search history.

(56) References Cited

U.S. PATENT DOCUMENTS

| | | | | |
|---|---|---|---|---|
| 2,717,955 A | * | 9/1955 | McGinty et al. | 362/147 |
| 2,997,575 A | * | 8/1961 | Schwartz | 362/364 |
| 4,862,334 A | * | 8/1989 | Ivey et al. | 362/149 |
| 5,726,722 A | * | 3/1998 | Uehara et al. | 349/66 |
| 6,523,976 B1 | * | 2/2003 | Turnbull et al. | 362/545 |
| 6,962,428 B2 | * | 11/2005 | Natsume | 362/545 |
| 2003/0053318 A1 | | 3/2003 | Amano | |
| 2003/0063472 A1 | | 4/2003 | Ban et al. | |
| 2006/0285348 A1 | | 12/2006 | Valcamp et al. | |

FOREIGN PATENT DOCUMENTS

| | | |
|---|---|---|
| EP | 1916472 A1 | 4/2008 |
| JP | 5-45811 U | 6/1993 |
| JP | 2003-54460 A | 2/2003 |
| JP | 2003-100114 A | 4/2003 |
| JP | 2004-247069 A | 9/2004 |
| JP | 2004-265697 A | 9/2004 |
| JP | 2005-268068 A | 9/2005 |
| JP | 2007-59075 A | 3/2007 |
| WO | WO 2005/028250 A1 | 3/2005 |

\* cited by examiner

*Primary Examiner* — John A Ward
(74) *Attorney, Agent, or Firm* — Birch, Stewart, Kolasch & Birch, LLP

(57) ABSTRACT

A taillight apparatus of a vehicle is arranged with a board provided with LEDs between a case and a lens. The board is arranged along a front and rear direction of the vehicle. A first reflector is provided at one end of the board on a side of the case, and is provided with a second reflector at the other end of the board on a side of the lens. The board is supported by interposing the board between the first reflector and the second reflector. The taillight apparatus configured in this manner has a reduced height dimension and a board with increased strength.

8 Claims, 6 Drawing Sheets

TAILLIGHT APPARATUS

TECHNICAL FIELD

The present invention relates to a taillight apparatus, particularly relates to a taillight apparatus of a motorcycle.

BACKGROUND ART

As a taillight apparatus of a background art, there is known a taillight apparatus in which a taillight and a brake light are arranged to align in an up and down direction, the taillight is provided with The taillight LED to direct in a rear direction, and the brake light is provided with LED for the brake light to direct in the rear direction (refer to, for example, Patent Reference 1).
[Patent Reference 1] JP-A-2003-054460

DISCLOSURE OF THE INVENTION

Problems that the Invention is to Solve

Meanwhile, according to the taillight apparatus described in Patent Reference 1 mentioned above, the taillight and the brake light are respectively provided with boards for mounting respective LEDs, the boards are arranged in an up and down direction of a vehicle in order to provide respective LEDs to direct in the rear direction, and therefore, there poses a problem that a height dimension of the taillight apparatus is enlarged and the taillight apparatus becomes large-sized. Further, it is desired to increase a strength of supporting the board.

The invention has been carried out in view of the problem and it is an object thereof to provide a taillight apparatus capable of downsizing the taillight apparatus by reducing a height dimension of the taillight apparatus and capable of increasing a strength of supporting a board.

SUMMARY OF INVENTION

Means for Solving the Problem

In order to achieve the object, a taillight apparatus of the invention is a taillight apparatus arranging a board provided with LEDs between a case and a lens, wherein the board is arranged along a front and rear direction of a vehicle, a first reflector is provided at one end of the board on a side of the case and a second reflector is provided at other end of the board on the side of the lens, and the board is supported by interposing the board between the first reflector and the second reflector.

Further, according to the taillight apparatus of the invention, the second reflector is connected to the first reflector.

Further, according to the taillight apparatus of the invention, the first reflector is supported by the lens.

Further, according to the taillight apparatus of the invention, the LEDs includes a taillight LED and a stop light LED, the taillight LED and the stop light LED are arranged to be apart from each other in the front and rear direction at an upper portion of the board, and the second reflector is arranged between the taillight LED and the stop light LED.

Further, according to the taillight apparatus of the invention, the taillight LED is arranged on a side of the case and the stop light LED is arranged on a side of the lens.

Further, according to the taillight apparatus of the invention, the stop light LEDs are respectively arranged at an upper and a lower portion of the board.

Further, according to the taillight apparatus of the invention, the board is inserted to and supported by groove portions respectively provided at the first reflector and the second reflector.

Further, according to the taillight apparatus of the invention, the board is horizontally arranged.

Advantage of the Invention

According to the taillight apparatus of the invention, the board is arranged along the front and rear direction of the vehicle, the first reflector is provided at the one end of the board on the side of the case, the second reflector is provided at the other end of the board on the side of the lens, the board is supported by interposing the board between the first reflector and the second reflector. Therefore, a strength of supporting the board can be increased. Further, the board is arranged along the front and rear direction of the vehicle. Therefore, a height dimension of the taillight apparatus can be reduced, and the taillight apparatus can be downsized.

Further, according to the taillight apparatus of the invention, the second reflector is connected to the first reflector. Therefore, the strength of supporting the board can be increased. Further, positioning of the second reflector relative to the first reflector can be facilitated.

Further, according to the taillight apparatus of the invention, the first reflector is supported by the lens. Therefore, positioning of the first reflector and the second reflector relative to the lens can be facilitated.

Further, according to the taillight apparatus of the invention, the LED includes the taillight LED and the stop light LED, the Taillight LED and the Stop light LED are arranged to be apart from each other in the front and rear direction at the upper portion of the board, and the second reflector is arranged between the Taillight LED and the Stop light LED. Therefore, the height dimension of the taillight apparatus can be reduced, and the taillight apparatus can be downsized.

Further, according to the taillight apparatus of the invention, the board is inserted to and supported by the groove portions respectively provided at the first reflector and the second reflector. Therefore, the strength of supporting the board can further be increased.

Figure 1:
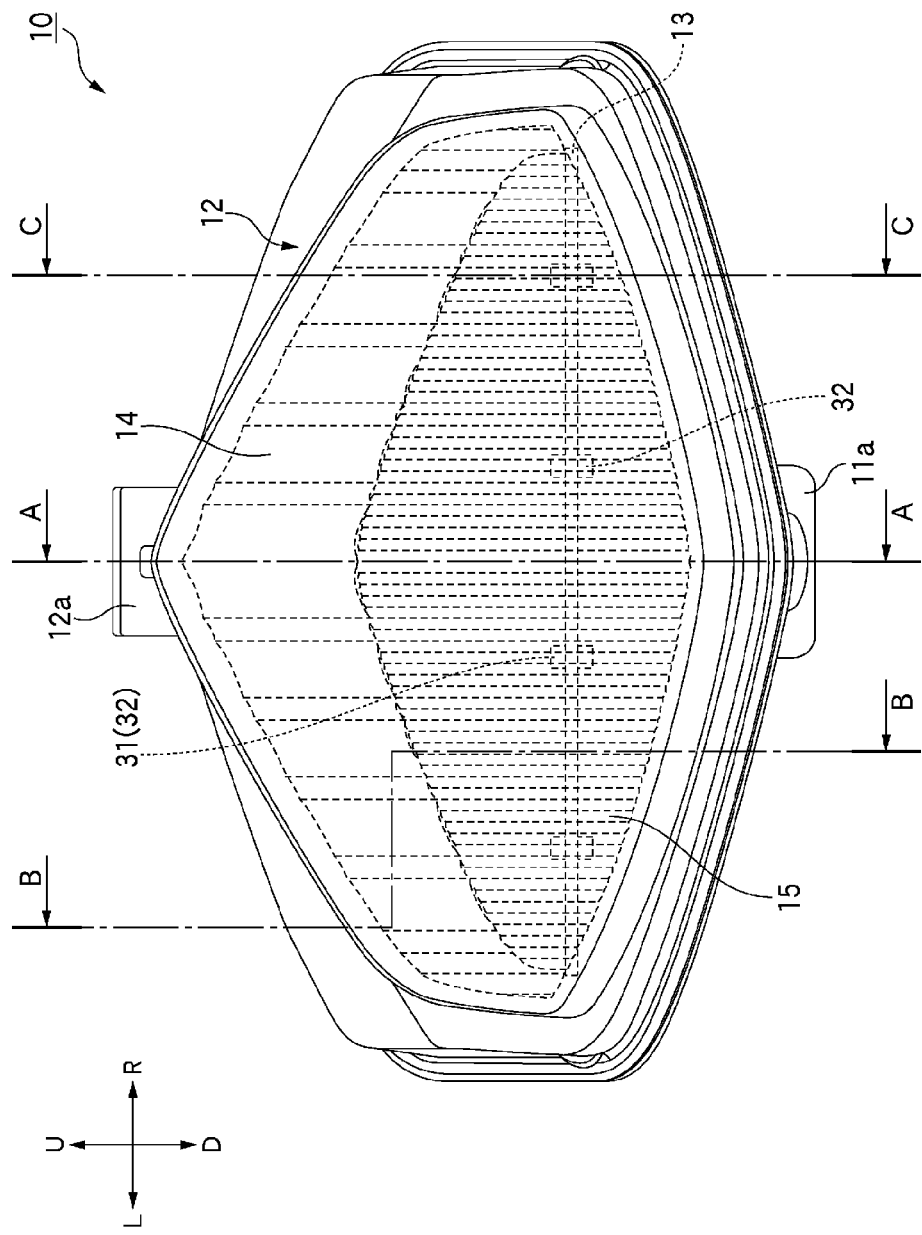
FIG. 1 is a front view for explaining an embodiment of a taillight apparatus according to the invention.

DESCRIPTION OF REFERENCE NUMERALS AND SIGNS 10 taillight apparatus
11 case
12 lens
13 board
21 first reflector
22 second reflector
23 board holding portion
23a groove portion
24 first reflecting portion
25 second reflecting portion 26 board holding portion
26a groove portion
27 third reflecting portion
31 taillight LED
32 stop light LED

BEST MODE FOR CARRYING OUT THE INVENTION

An embodiment of a taillight apparatus according to the invention will be explained in details in reference to the drawings as follows. Further, the drawings are viewed in directions of notations, and in the respective drawings, a front side of a vehicle is designated by notation Fr, a rear side thereof is designated by notation Rr, a left side thereof is designated by notation L, a right side thereof is designated by notation R, an upper side thereof is designated by notation U, and a lower side thereof is designated by notation D.

As shown by FIG. 1 through FIG. 6, a taillight apparatus 10 of the embodiment includes a case 11, a lens 12 a front opening of which is closed by the case 11, a board 13 arranged between the case 11 and the lens 12, a first reflector 21 provided at a front end of the board 13, a second reflector 22 provided at a rear end of the board 13, and a taillight LED 31 and a stop light LED 32 provided at the board 13.

Figure 2:
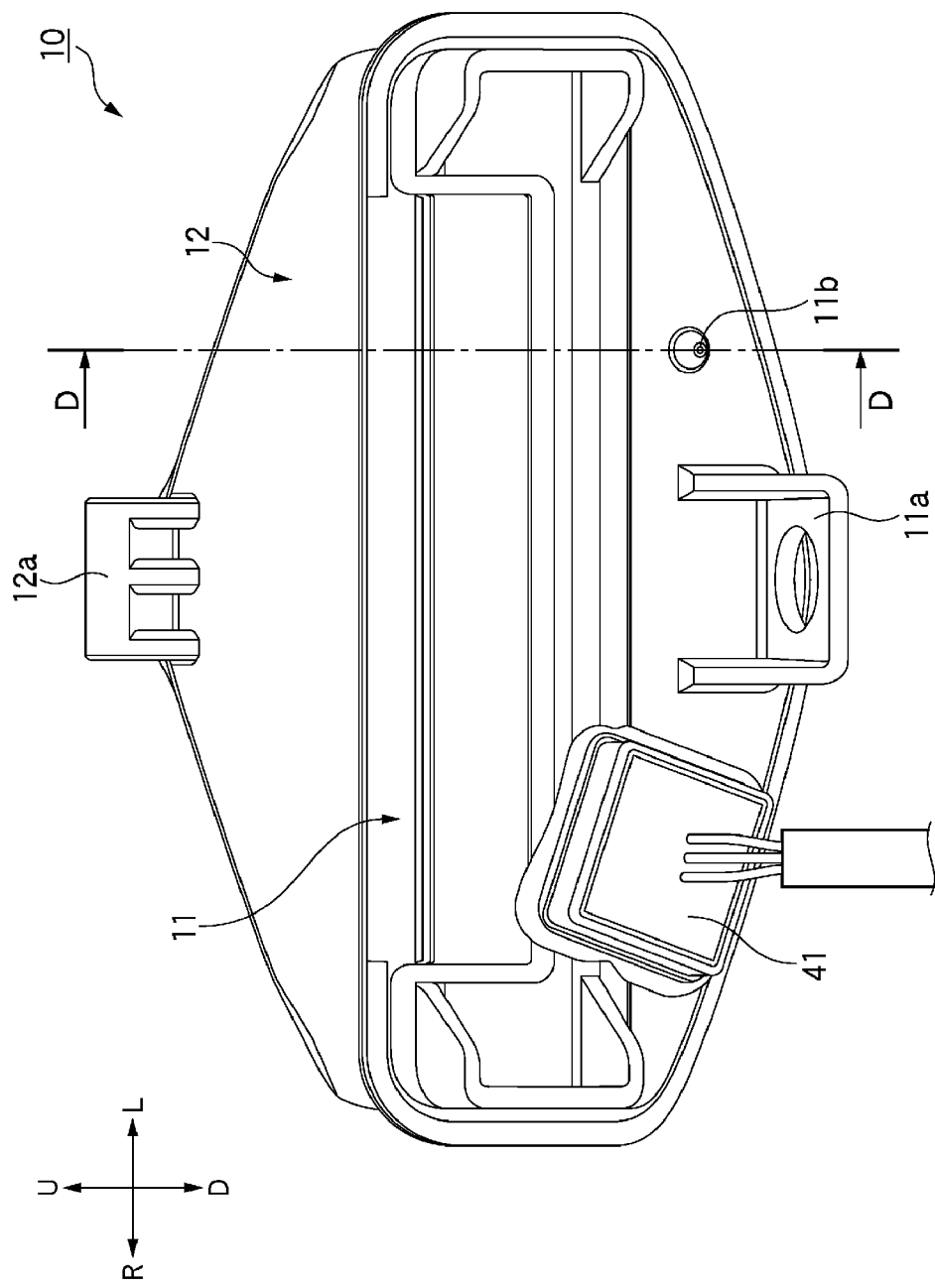
FIG. 2 is a rear view of the taillight apparatus shown in FIG. 1.
Figure 3:
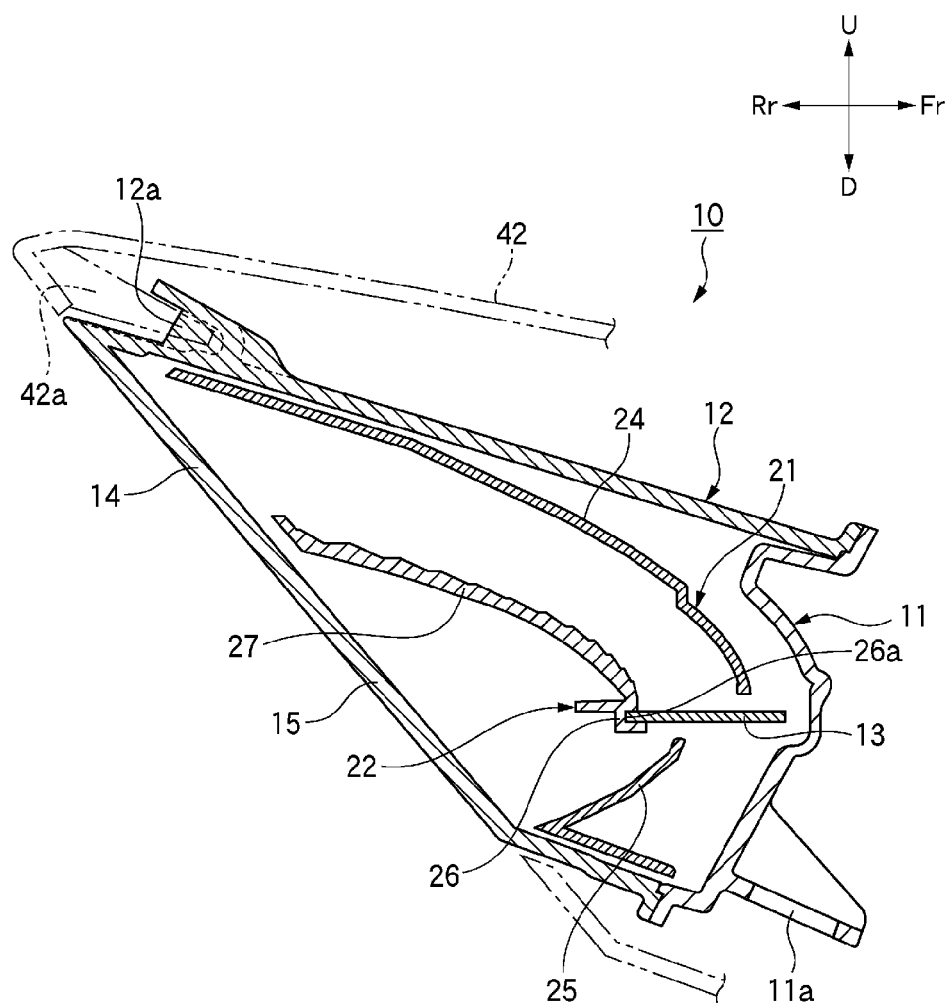
FIG. 3 is a sectional view taken along a line A-A of FIG. 1.
Figure 5:
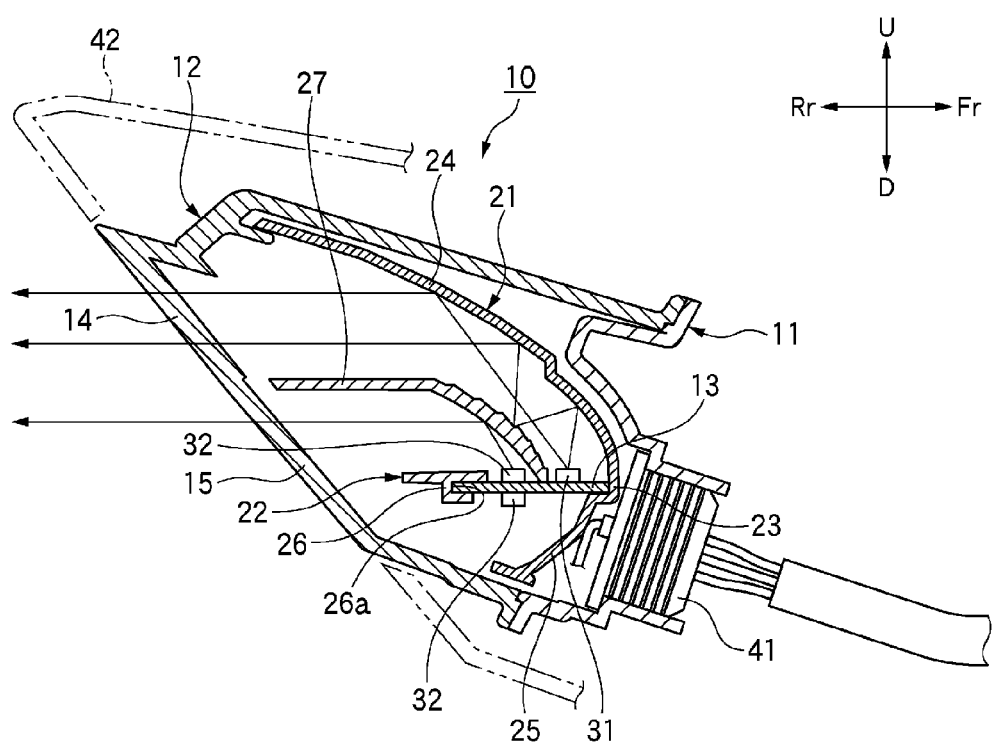
FIG. 5 is a sectional view taken along a line C-C of FIG. 1.
Figure 6:
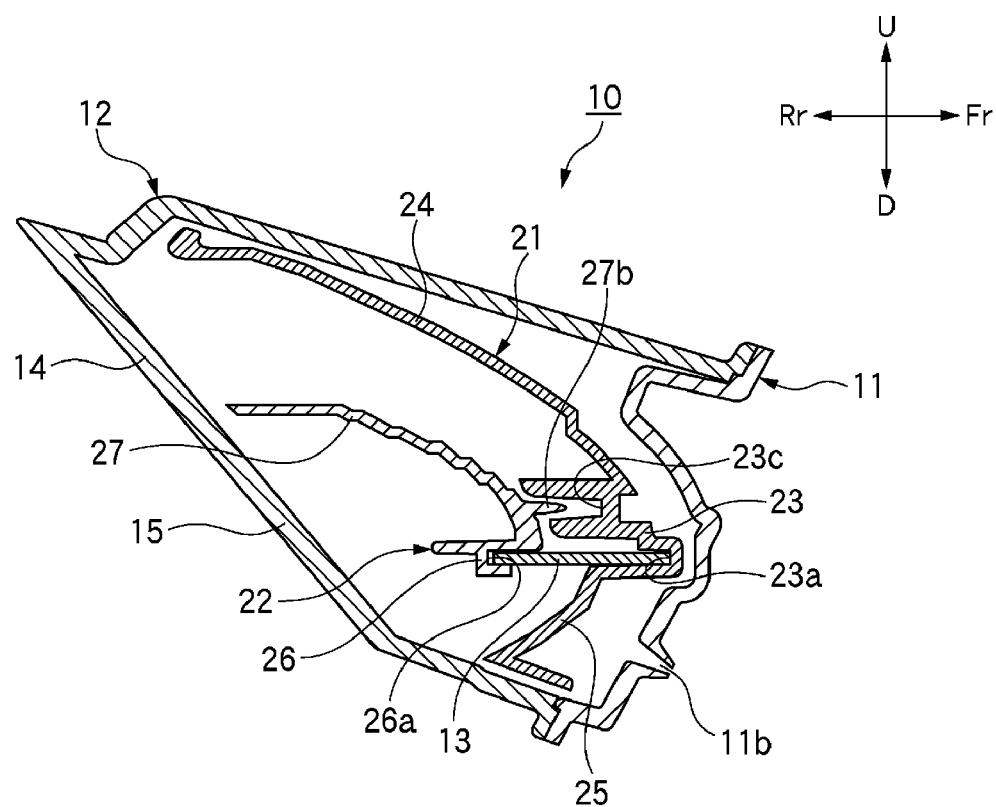
FIG. 6 is a sectional view taken along a line D-D of FIG. 2.

The case 11 is molded by a synthetic resin and as shown by FIG. 2 and FIG. 3, a lower portion of a center in a vehicle width direction thereof is formed with an attaching bracket 11a for attaching the taillight apparatus 10 to a side of the vehicle. Further, as shown by FIG. 2 and FIG. 6, a lower portion on a left side in the vehicle width direction of the case 11 is formed with an air hole 11b for adjusting a pressure at inside of the taillight apparatus 10. Further, as shown by FIG. 2 and FIG. 5, a lower portion thereof on a right side in the vehicle width direction is provided with a connector 41 connected to a harness, not illustrated.

The lens 12 is molded by a synthetic resin having a light transmitting property and is formed substantially in a triangular shape in a vertical sectional view thereof constituting a shape of converging as proceeding to a rear side. Further, as shown by FIG. 1 through FIG. 3, the lens 12 is formed with an engaging recessed portion 12a for engaging an engaging portion 42a formed at a rear end portion of a rear cowl 42.

As shown by FIG. 3 through FIG. 6, the board 13 is arranged horizontally or substantially horizontally along a front and rear direction of the vehicle and is supported by pinching the board 13 by the first reflector 21 and the second reflector 22 from front and rear directions. Further, the taillight LED 31 is provided at a front portion of an upper face of the board 13 on a side of the case 11. The stop light LED 32 is similarly provided at a rear portion of the upper face on the side of the lens 12. The taillight LED 31 and the stop light LED 32 are arranged to be apart from each other in the front and rear direction at an upper portion of the board 13. Further, the taillight LED 31 and the stop light LED 32 are constituted by aligning a plurality of LEDs (Light Emitting Diodes) along the vehicle width direction. Further, the stop light LED 32 is provided at a lower portion of the board 13 symmetrically with the upper portion.

As shown by FIG. 3 through FIG. 6, the first reflector 21 includes a board holding portion 23 for supporting a side of the case 11 at a front end of the board 13, a first reflecting portion 24 extended from an upper portion of the board holding portion 23 in a rear direction and in an upper direction for reflecting light emitted by the taillight LED 31, and a second reflecting portion 25 extended from a lower portion of the board holding portion 23 in the rear direction and in the lower direction for reflecting light emitted by the stop light LED 32.

Figure 4:
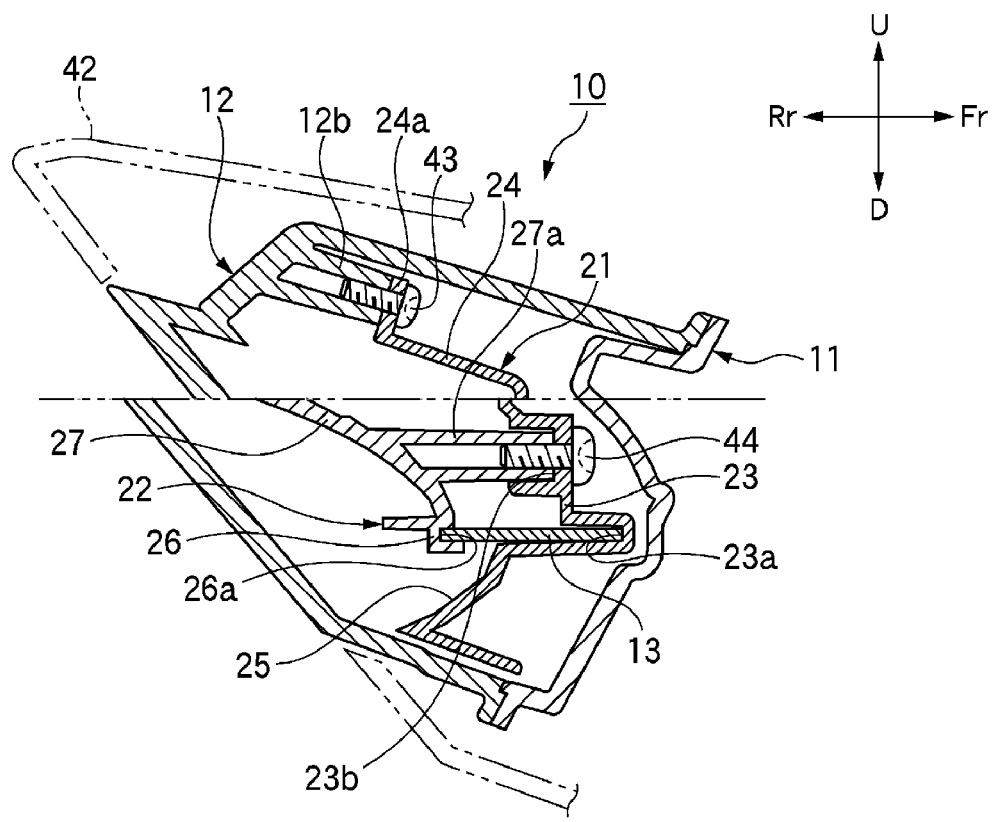
FIG. 4 is a sectional view taken along a line B-B of FIG. 1.

Further, in the first reflector 21, as shown by FIG. 4, a fixing piece 24a formed at an upper end portion of the first reflecting portion 24 is fastened to a boss portion 12b formed at a rear face of the lens 12 by a fixing screw 43. Thereby, the first reflector 21 is supported by the lens 12.

As shown by FIG. 3 through FIG. 6, the second reflector 22 includes a board holding portion 26 for supporting the side of the lens 12 at the rear end of the board 13, and a third reflecting portion 27 extended in a bent shape from the board holding portion 26 in the rear direction and in the upper direction for reflecting light emitted by the taillight LED 31 by a back face thereof and reflecting light emitted by the stop light LED 32 by a surface thereof.

Further, in the second reflector 22, as shown by FIG. 4, a boss portion 27a formed at the back face of the third reflecting portion 27 is fitted to a recessed portion 23b formed at the rear face of the board holding portion 23 of the first reflector 21 to be fastened by a fixing screw 44. Thereby, the second reflector 22 is supported by the first reflector 21 to be coupled with each other.

Further, as shown by FIG. 6, the second reflector 22 is formed with a fitting projected portion 27b of the back face of the third reflecting portion 27 in the front direction, and a fitting recessed portion 23c is formed at the rear face of the board holding portion 23 of the first reflector 21. Further, by fitting the fitting projected portion 27b to the fitting recessed portion 23c, the first reflector 21 and the second reflector 22 are positioned with a high accuracy.

Further, according to the embodiment, as described above, the taillight LED 31 and the stop light LED 32 are arranged to be apart from each other on front and rear sides of the board 13, and as shown by FIG. 5, the second reflector 22 is arranged to partition the taillight LED 31 and the stop light LED 32.

Further, according to the embodiment, as shown by FIG. 3 through FIG. 6, the board holding portion 23 of the first reflector 21 is formed with a groove portion 23a for inserting the front end of the board 13, and the board holding portion 26 of the second reflector 22 is formed with a groove portion 26a for inserting the rear end of the board 13. By inserting the board 13 to the groove portions 23a and 26a, the board 13 is solidly supported by the first reflector 21 and the second reflector 22.

Further, the board 13 is electrically connected to a lamp control apparatus, not illustrated, mounted to the vehicle via a connector 41 to make the taillight LED 31 and the stop light LED 32 respectively emit light by a signal provided from the lamp control apparatus. Further, as shown by FIG. 5, light emitted by the taillight LED 31 is reflected by the first reflecting portion 24 and the third reflecting portion 27, thereafter, passes a taillight display portion 14 formed at an upper half of the lens 12 to thereby light the taillight display portion 14. Further, light emitted by the stop light LED 32 is reflected by the second reflecting portion 25, thereafter, passes a stop light display portion 15 formed at a lower half of the lens 12 to light the stop light display portion 15. Further, according to the embodiment, as shown by FIG. 1, an interval of a lens cut of the stop light display portion 15 is set to be shorter than an interval of a lens cut of the taillight display portion 14.

As explained above, according to the taillight apparatus 10 of the embodiment, the board 13 is arranged along the front and rear direction of the vehicle, the first reflector 21 is provided at the front end of the board 13 on the side of the case 11, the second reflector 22 is provided at the rear end of the board 13 on the side of the lens 12, the board 13 is supported by interposing the board 13 between the first reflector 21 and the second reflector 22. Therefore, the strength of supporting the board 13 can be increased. Further, the board 13 is arranged along the front and rear direction of the vehicle. Therefore, a height dimension of the taillight apparatus 10 can be reduced and the taillight apparatus 10 can be downsized.

Further, according to the taillight apparatus 10 of the embodiment, the second reflector 22 is connected to the first reflector 21. Therefore, the strength of supporting the board 13 can be increased. Further, positioning of the second reflector 22 relative to the first reflector 21 can be facilitated.

Further, according to the taillight apparatus 10 of the embodiment, the first reflector 21 is supported by the lens 12. Therefore, positioning of the first reflector 21 and the second reflector 22 relative to the lens 12 can be facilitated.

Further, according to the taillight apparatus 10 of the embodiment, the taillight LED 31 and the stop light LED 32 are provided, the taillight LED 31 and the stop light LED 32 are arranged to be apart from each other in the front and rear direction at the upper portion of the board 13, the second reflector 22 is arranged between the taillight LED 31 and the stop light LED 32. Therefore, the height dimension of the taillight apparatus 10 can be reduced and the taillight apparatus 10 can be downsized.

Further, according to the taillight apparatus 10 of the embodiment, the board 13 is inserted to and supported by the groove portions 23a and 26a provided at the first reflector 21 and the second reflector 22. Therefore, the strength of supporting the board 13 can further be increased.

The invention claimed is:

1. A taillight apparatus comprising:
    a case;
    a lens;
    a board on which LEDs are mounted and which is arranged along a front and rear direction of a vehicle between the case and the lens;
    a first reflector provided at one end of the board on a side of the case; and
    a second reflector provided at the other end of the board on a side of the lens,
    wherein the board is supported by interposing the board between the first reflector and the second reflector.

2. The taillight apparatus according to claim 1, wherein the second reflector is connected to the first reflector.

3. The taillight apparatus according to claim 1, wherein the first reflector is supported by the lens.

4. The taillight apparatus according to claim 1, wherein the LEDs includes a taillight LED and a stop light LED;
    wherein the taillight LED and the stop light LED are apart from each other in the front and rear direction at an upper portion of the board; and
    wherein a part of the second reflector is arranged between the taillight LED and the stop light LED.

5. The taillight apparatus according to claim 4, wherein the taillight LED is arranged on a side of the case and the stop light LED is arranged on a side of the lens.

6. The taillight apparatus according to claim 5, further comprising a lower side stop light LED mounted at a lower portion of the board.

7. The taillight apparatus according to claim 1, wherein the board is inserted to and supported by groove portions respectively provided on the first reflector and the second reflector.

8. The taillight apparatus according to claim 1, wherein the board is horizontally arranged.

* * * * *